(12) United States Patent
Van Dijck et al.

(10) Patent No.: US 11,110,643 B2
(45) Date of Patent: Sep. 7, 2021

(54) HEAT-RESISTANT AND BIAXIALLY STRETCHED BLOW-MOLDED PLASTIC CONTAINER HAVING A BASE MOVABLE TO ACCOMMODATE INTERNAL VACUUM FORCES

(71) Applicant: Plastipak BAWT S.à r.l., Bascharage (LU)

(72) Inventors: Sam Van Dijck, Hoogstraten (BE); Alain Dessaint, Kampenhout (BE); Jan Deckers, Brecht (BE)

(73) Assignee: Plastipak BAWT Sá.r.l., Bascharage (LU)

( * ) Notice: Subject to any disclaimer, the term of this patent is extended or adjusted under 35 U.S.C. 154(b) by 179 days.

(21) Appl. No.: 15/313,732

(22) PCT Filed: May 19, 2015

(86) PCT No.: PCT/EP2015/060946
§ 371 (c)(1),
(2) Date: Nov. 23, 2016

(87) PCT Pub. No.: WO2015/177112
PCT Pub. Date: Nov. 26, 2015

(65) Prior Publication Data
US 2017/0190097 A1 Jul. 6, 2017

(30) Foreign Application Priority Data
May 23, 2014 (EP) ..................................... 14169671

(51) Int. Cl.
*B29C 49/64* (2006.01)
*B29C 49/06* (2006.01)
(Continued)

(52) U.S. Cl.
CPC .......... *B29C 49/6481* (2013.01); *B29C 49/06* (2013.01); *B29C 49/12* (2013.01);
(Continued)

(58) Field of Classification Search
CPC .... B29C 2049/4807; B29C 2049/4848; B29C 49/06; B29C 49/08; B29C 49/12;
(Continued)

(56) References Cited

U.S. PATENT DOCUMENTS 4,318,882 A 3/1982 Agrawal et al.
5,585,065 A * 12/1996 Nakamaki et al. ..... B29C 49/16
264/521

(Continued)

FOREIGN PATENT DOCUMENTS

CN 100546879 C 10/2009
CN 102958673 A 3/2013
(Continued)

OTHER PUBLICATIONS

International Search Report PCT/EP2015/060946, dated Sep. 18, 2015.

*Primary Examiner* — James N Smalley
*Assistant Examiner* — Madison L Poos
(74) *Attorney, Agent, or Firm* — Fishman Stewart PLLC

(57) ABSTRACT

A heat-resistant and biaxially stretched blow-molded plastic container includes a base movable to accommodate vacuum forces generated within the container and thereby decrease the volume of the container. Embodiments of a container include a push-up portion, and first and second parting lines that are separated from one another by a gap and that extend on opposite sides of the push-up portion. Embodiments of such a container exhibit one or more of the following: (a) a distance between each parting line and the center of the base is not more than 20 mm; (b) a distance between the two
(Continued)

parting lines is not more than 40 mm; and/or (c) a distance between the two parting lines is less than 50% of the transverse dimension of the base measured between the two outermost points of the parting lines. Methods for blow molding heat-resistant plastic containers are also disclosed.

23 Claims, 12 Drawing Sheets

(51) Int. Cl.
| | |
|---|---|
| *B29C 49/54* | (2006.01) |
| *B65D 1/02* | (2006.01) |
| *B65D 79/00* | (2006.01) |
| *B29C 49/12* | (2006.01) |
| *B29C 49/48* | (2006.01) |
| *B29C 49/42* | (2006.01) |
| *B29C 49/08* | (2006.01) |
| *B29K 67/00* | (2006.01) |
| *B29L 31/00* | (2006.01) |

(52) U.S. Cl.
CPC .......... *B29C 49/541* (2013.01); *B29C 49/649* (2013.01); *B65D 1/0276* (2013.01); *B65D 79/005* (2013.01); *B29C 49/08* (2013.01); *B29C 49/4273* (2013.01); *B29C 2049/4807* (2013.01); *B29C 2049/4848* (2013.01); *B29K 2067/003* (2013.01); *B29K 2995/0016* (2013.01); *B29L 2031/7158* (2013.01)

(58) Field of Classification Search
CPC .............. B29C 49/4273; B29C 49/541; B29C 49/6481; B29C 49/649; B29K 2067/003; B29K 2295/0016; B29L 2031/7158; B65D 1/0276; B65D 79/005
USPC ........................................................ 220/608
See application file for complete search history.

(56) References Cited

U.S. PATENT DOCUMENTS

| | | | |
|---|---|---|---|
| 6,080,353 A | * | 6/2000 | Tsuchiya ............. B29C 49/6445 |
| | | | 264/458 |
| 6,277,321 B1 | * | 8/2001 | Vailliencourt .......... B29C 49/18 |
| | | | 264/529 |
| 6,942,116 B2 | | 9/2005 | Lisch et al. |
| 8,739,994 B1 | * | 6/2014 | Prichett, Jr. et al. ........................ |
| | | | B65D 1/0261 |
| | | | 215/373 |
| 2014/0061211 A1 | | 3/2014 | Patcheak et al. |
| 2014/0069937 A1 | | 3/2014 | Melrose et al. |
| 2014/0123603 A1 | * | 5/2014 | Denner .................. B67C 3/045 |
| | | | 53/440 |
| 2014/0145378 A1 | | 5/2014 | Deau et al. |
| 2015/0021343 A1 | * | 1/2015 | Usami ...................... B65D 1/02 |
| | | | 220/675 |

FOREIGN PATENT DOCUMENTS

| | | | | |
|---|---|---|---|---|
| EP | 0559103 A1 | | 9/1993 | |
| EP | 2586588 A1 | | 5/2013 | |
| FR | 2975332 A1 | | 11/2012 | |
| WO | WO-2013033544 A2 | | 3/2013 | |
| WO | WO 2013033550 | * | 3/2013 | .......... B65D 1/0284 |

* cited by examiner

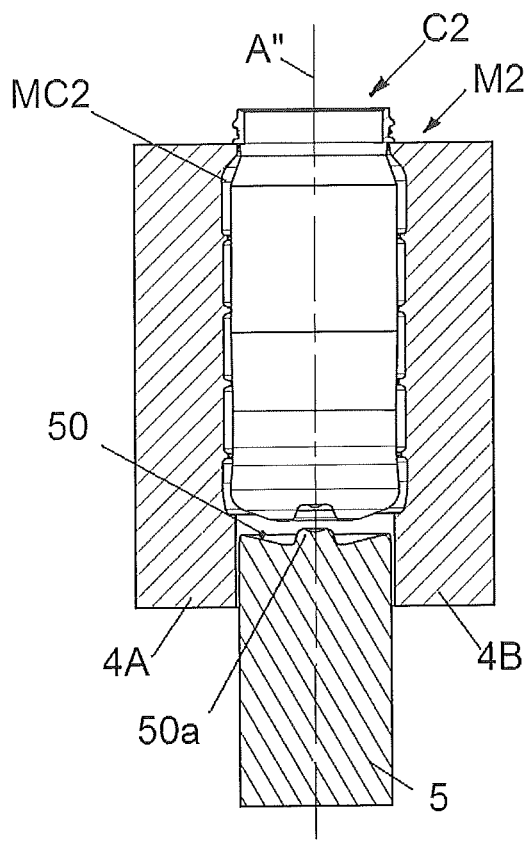
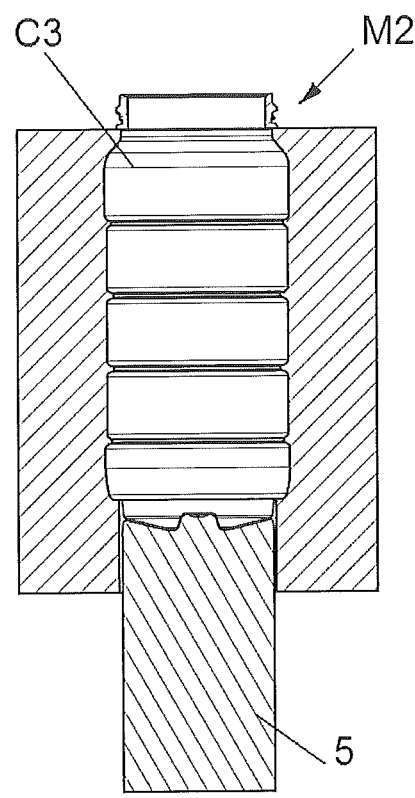
FIG.7   FIG.8
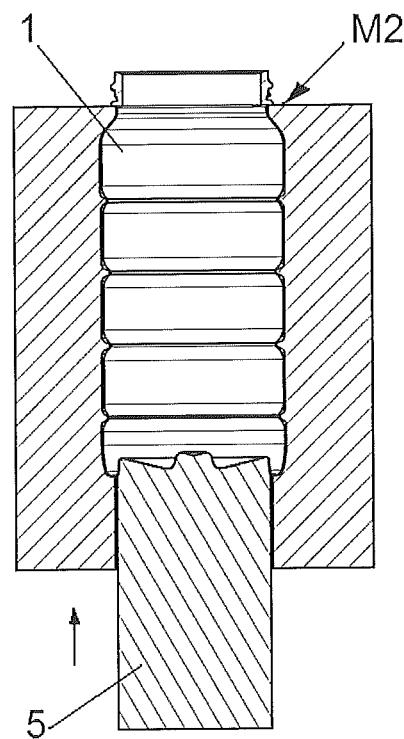
FIG.9

HEAT-RESISTANT AND BIAXIALLY STRETCHED BLOW-MOLDED PLASTIC CONTAINER HAVING A BASE MOVABLE TO ACCOMMODATE INTERNAL VACUUM FORCES

CROSS-REFERENCE TO RELATED APPLICATIONS

This application is a national stage filing based upon International PCT Application No. PCT/EP2015/060946, with an international filing date of May 19, 2015, which claims the benefit of priority to EP Application No. 14169671.6, filed May 23, 2014, both of which applications are fully incorporated herein by reference as though fully set forth herein.

TECHNICAL FIELD

The present invention relates to the technical field of double-blow molding a heat resistant and biaxially stretched plastic container, and in particular a heat resistant and biaxially stretched PET container, having a base that is movable to accommodate vacuum forces generated within the container, without unwanted deformation of other portions of the container. The heat resistant container can be used for example in hot fill applications, or can be sterilized, notably by carrying out a pasteurization process or a retort process.

BACKGROUND

Plastic containers and in particular PET (Polyethylene Terephtalate) containers are now widely used for storing various commodities, and in particular food products, liquids, etc. . . . . In particular, manufacturers and fillers, as well as consumers, have recognized that PET containers are lightweight, not expensive, can be manufactured in large quantities and can be recycled.

Biaxially stretched plastic containers, and in particular PET containers, manufactured by conventional ISBM techniques (Injection Stretch Blow Molding) using cold blowing molds, i.e. blowing molds at ambient temperature or less, are not heat resistant, and can be easily deformed by the heat. For example biaxially stretched containers are easily deformed at high temperature above the Tg (temperature of glass transition) of their plastic material, i.e. above 70° C. for PET.

There are however many applications wherein heat resistant plastic containers are needed, like for example hot fill applications, or containers submitted to sterilization process, and in particular to a pasteurization process or a retort process.

In a hot filling process, the plastic container is filled with a commodity such as for example a liquid, while the commodity is at an elevated temperature. For example for liquids, such as juices, the temperature is typically between 68° C. and 96° C., and is usually around 85° C. When packaged in this manner, the high temperature of the commodity also sterilizes the container at the time of filling. The bottling industry refers to this process as hot filling, and containers designed to withstand the process are commonly referred as hot-fill containers.

In a hot filling process, after being hot-filled, the container is capped and allowed to reside at generally the filling temperature for a few minutes and is then actively cooled prior to transferring to labeling, packaging, and shipping operations.

When the product in the container is liquid or semi-liquid, this cooling reduces the volume of the product inside the container. This product shrinkage phenomenon results in the creation of a vacuum within the container. If not controlled or otherwise accommodated, these vacuum pressures can result in unwanted deformations of the container, which leads to either an aesthetically unacceptable container or one that is unstable.

Typically, container manufacturers accommodate vacuum pressures by incorporating deformable structures.

Plastic hot-fill containers incorporating such deformable structures are for example described in the following publications: U.S. Pat. Nos. 5,005,716; 5,503,283; 6,595,380; 6,896,147; 6,942,116; and 7,017,763, and PCT application WO 2001/014759. In these publications, a deformable structure to at least partially compensating the volume reduction that occurs after capping and during cooling of a hot-filled product, is located in the base of the container. More particularly, in PCT application WO 2011/014759, the movable container base includes a central push-up portion and is designed to move up to accommodate internal vacuum pressures.

Plastic hot-fill containers are also described for example in the following publications: European patent application EP 1 947 016 and U.S. Pat. Nos. 5,222,615; 5,762,221; 6,044,996; 6,662,961; 6,830,158. In these publications, a deformable portion, to at least partially compensating the volume reduction that occurs after capping and during cooling of a hot-filled product, is located in the shoulder part of the container.

Plastic hot-fill containers are also described for example in the following publications: U.S. Pat. Nos. 5,092,475; 5,141,121; 5,178,289; 5,303,834; 5,704,504; 6,585,125; 6,698,606; 5,392,937; 5,407,086; 5,598,941; 5,971,184; 6,554,146; 6,796,450. In these publications, the deformable portions, to at least partially compensating the volume reduction that occurs after capping and during cooling of a hot-filled product, are located in the sidewall of the main body of the container, and are commonly referred as vacuum panels. In this case, the volume compensation can be advantageously increased.

The hot filling process is acceptable for commodities having a high acid content, but is not generally acceptable for non-high acid content commodities. For non-high acid commodities, pasteurization and retort are generally the preferred sterilization processes.

Pasteurization and retort are both processes for cooking or sterilizing the contents of a container after filling. Both processes include the heating of the contents of the container to a specified temperature, usually above approximately 70° C. for a specified length of time (for example 20-60 minutes). Retort differs from pasteurization in that retort uses higher temperatures to sterilize the container and cook its contents. Retort also generally applies elevated air pressure externally to the container to counteract pressure inside the container.

Container manufacturers have developed different thermal processes for imparting heat resistance to biaxially stretched plastic containers, and in particular to biaxially stretched PET containers.

A first method commonly referred as "heat setting", includes blow molding a plastic preform, and for example a PET preform, against a mold heated to a temperature higher than Tg, and more particularly higher than the target heat resistance temperature value, to obtain a biaxially stretched container of higher crystallinity, and holding the biaxially stretched container against the heated mold for a certain length of time to remove residual strain produced by the biaxial stretching. For example, for a PET container, the blow mold temperature is approximately between 120° C. and 130° C., and the heat set holding time of the container is typically a few seconds Conventional heat set PET containers have typically a heat resistant up to a maximum of approximately 100° C., and cannot be used for containing a content which is heat treated at temperatures much higher than 100° C.

Another thermal process to impart heat resistance to a biaxially stretched plastic container is commonly referred in the industry as the "double-blow process" or "double-blow heat set" process. When molding a plastic container with this process, an injection molded preform is conveyed through a preheating oven to produce a desired temperature profile within the preform. When at the proper temperature, the preform exits the oven and is transferred to a primary heated blow mold, wherein the preform is blown to form a primary biaxially stretched container. The volume of this primary biaxially stretched container is typically larger than the volume of the final container, and is for example sized to be 15%-25% larger than the final container volume.

In a first variant, the primary biaxially stretched container is transferred to a heat treating oven. In this oven, the applied heat causes the primary biaxially stretched container to undergo a significant degree of shrinkage, which significantly releases orientation stresses in the container, and will allow the container to be re-blown.

In a second variant, this shrinking step is performed inside the primary blow mold by holding the primary biaxially stretched container inside the heated primary blow mold for a sufficient length of time to obtain the required shrinkage.

For both variants, after this shrinking step performed by heat treatment, a secondary shrunk container of smaller volume is obtained. The volume of this secondary shrunk container is slightly smaller than the volume of the final container.

The secondary shrunk container is transferred inside a secondary heated blow mold and is re-blown inside said secondary heated blow mold, in order to form a final biaxially stretched and heat resistant plastic container. This biaxially stretched and heat resistant plastic container is then removed from the secondary heated blow mold.

The biaxially stretched containers issued from a double-blow process are generally heat resistant to higher temperatures than the aforesaid conventional single blow heat setting process.

One drawback of the aforesaid known double-blow process is that with the conventional designs of known primary blow molds, the shrinking of the primary biaxially stretched container leads to a shrinking of the container base that typically reduces too much the transverse size of the base, which in turn leads to a significant stretching of the base of the shrunk secondary container during the second blow molding step. This stretching of the base during the second blowing blow molding step induces significant residual stresses in the final container base, which therefore can still provoke a detrimental residual shrinking of the base of the final container when hot filled.

When the container has a movable base to accommodate internal vacuum pressures, like for example the deformable container base described in aforesaid PCT application WO 2011/014759, this residual shrinking of the base of the final container when hot filled detrimentally deforms said movable base, in such a way that said base is moved up to an extent that deteriorates the mobility of the base and can render this base not operative or less efficient afterwards for accommodating internal vacuum pressures.

SUMMARY

A main objective of the invention is to make heat resistant and biaxially stretched plastic container that is manufactured by carrying out a double-blow process, and that includes an operative movable base to accommodate internal vacuum pressures.

SUMMARY OF THE INVENTION

To achieve this objective, the invention relates to a heat resistant and biaxially stretched blow-molded plastic container issued from a double-blow process, as defined in any one of claim 1. The invention also relates to a method for double-blow molding a heat resistant plastic container as defined in claim 11.

Pursuant to the invention, and in contrast with the prior art, the container base of the invention, that is deformable base to accommodate internal vacuum pressures, is less subjected to a shrinking phenomenon when the container is hot filled, and thereby advantageously keeps a very good mobility to accommodate internal vacuum pressures.

BRIEF DESCRIPTION OF THE DRAWINGS

The technical characteristics and advantages of the invention will appear more clearly on reading the following detailed description of several embodiments of the invention, which detailed description is made by way of non-exhaustive and non-limiting examples, and with reference to the appended drawings, as follows:

FIGS. 7 to 9 are longitudinal cross section views of a secondary blow mold showing the successive molding steps.

DETAILED DESCRIPTION

Some preferred embodiments of the invention are discussed in detail below. While specific exemplary embodiments are discussed, it should be understood that this is done for illustration purpose only. A person skilled in the art will recognize that other container designs or container dimensions can be used without parting from the spirit and scope of the invention.

Figure 2:
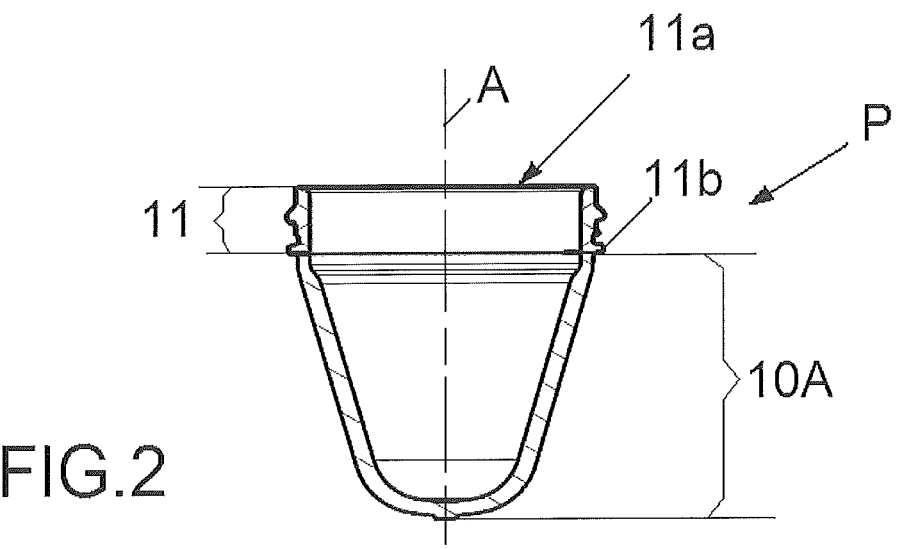
FIG. 2 is a longitudinal cross section view of a wide-mouth preform.
Figure 1:
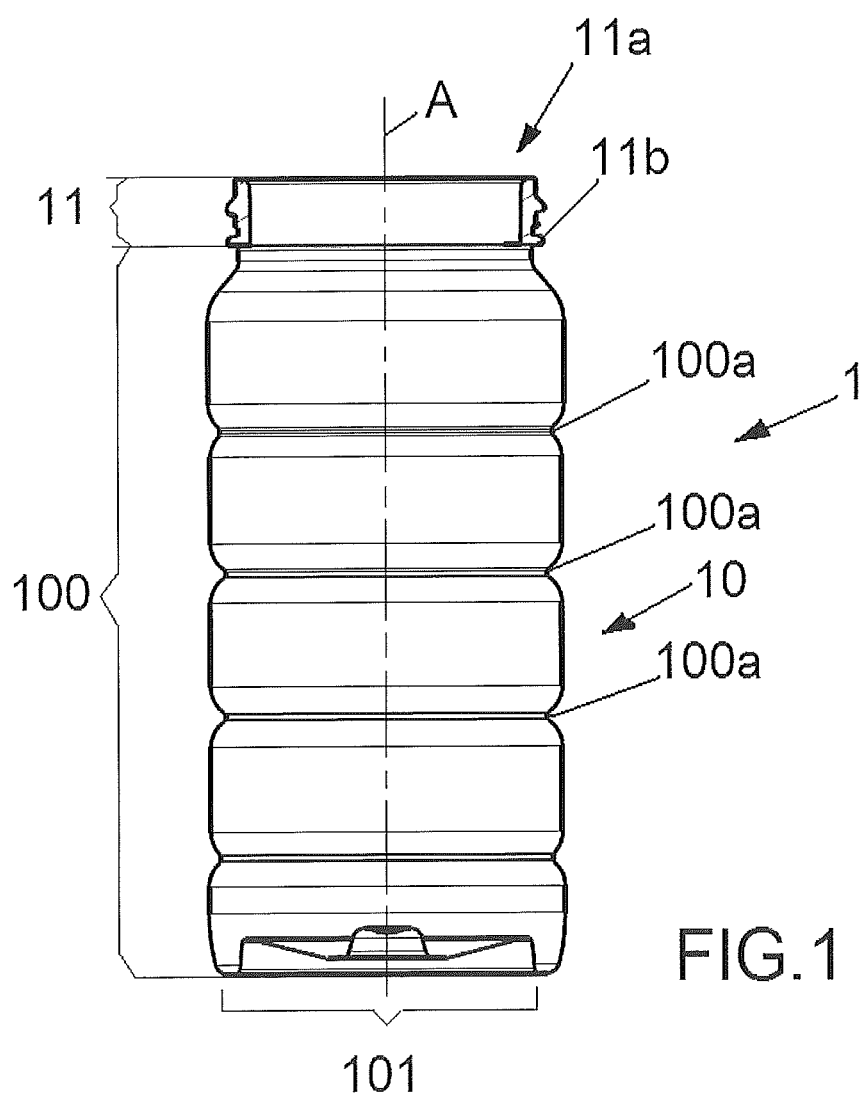
FIG. 1 shows an example of a biaxially stretch blow molded and heat resistant container obtained by double-blow molding the preform of FIG. 2.

Referring now to the drawings, FIG. 1 illustrates an example of a wide-mouth heat resistant biaxially stretched plastic container 1, which has been obtained by double-blow molding the wide-mouth preform P of FIG. 2.

The preform P of FIG. 2 can be manufactured by the well-known technique of injection molding.

The container 1 of FIG. 1 has a biaxially stretched blow-molded hollow body 10 defining a central vertical axis A, and a cylindrical neck finish 11 comprising a top pouring opening 11a and a neck support ring 11b. The biaxially stretched blow-molded hollow body 10 comprises a vertical sidewall 100 extended by a transverse bottom wall 101 forming the base of the container.

The sidewall 100 comprises annular reinforcing ribs 100a.

The bottom wall 101 is designed to be movable inwardly to absorb vacuum pressures inside the container 1 when hot filled.

Within the scope of the invention, the plastic container 1 and preform P can be made of any thermoplastic material that can be processed by using injection stretched blow molded techniques. Preferred thermoplastic materials useful for the invention are polyesters, and in particular polyethylene terephthalate (PET), homo or copolymers thereof, and blend thereof. Other materials suitable for use in the present invention are polypropylene (PP), polyethylene (PE), polystyrene (PS), polyvinyl chloride (PVC) and polylactic acid (PLA), polyethylene-furanoate (PEF), homo or copolymers thereof, and blend thereof.

Although the preform P and container 1 shown in the appended drawings are monolayer, the invention is however not limited to monolayer preforms and monolayer containers, but encompasses also multilayer preforms and multilayer containers.

Within the scope of the invention, the biaxially stretched blow-molded hollow body 10 of the container 1 can have any shape and any size. The hollow body 10 can be cylindrical, or can have other shape in transverse cross section (i.e. in a plan perpendicular to central vertical axis A), including notably oval shape and any polygonal shape, including notably square shape, rectangular shape, hexagonal shape, octagonal shape. The hollow body 10 of the container does not necessarily comprise ribs 100a.

The invention is also not limited to the manufacture of heat resistant plastic containers having a wide-mouth, but encompasses also the manufacture of a heat resistant plastic container having a smaller mouth.

In the particular example of FIG. 1, the central axis A of the container body 10 is also the central axis of the cylindrical neck finish 11. In other variants within the scope of the invention, the central axis of the cylindrical neck finish 11 is not necessarily the same than the vertical central axis A of the stretched blow-molded hollow body 10, but can be offset from said vertical central axis A. The central axis of the cylindrical neck finish 11 is also not necessarily parallel to the vertical central axis A of the stretched blow-molded hollow body 10, and the neck finish is not necessarily cylindrical.

Figure 3:
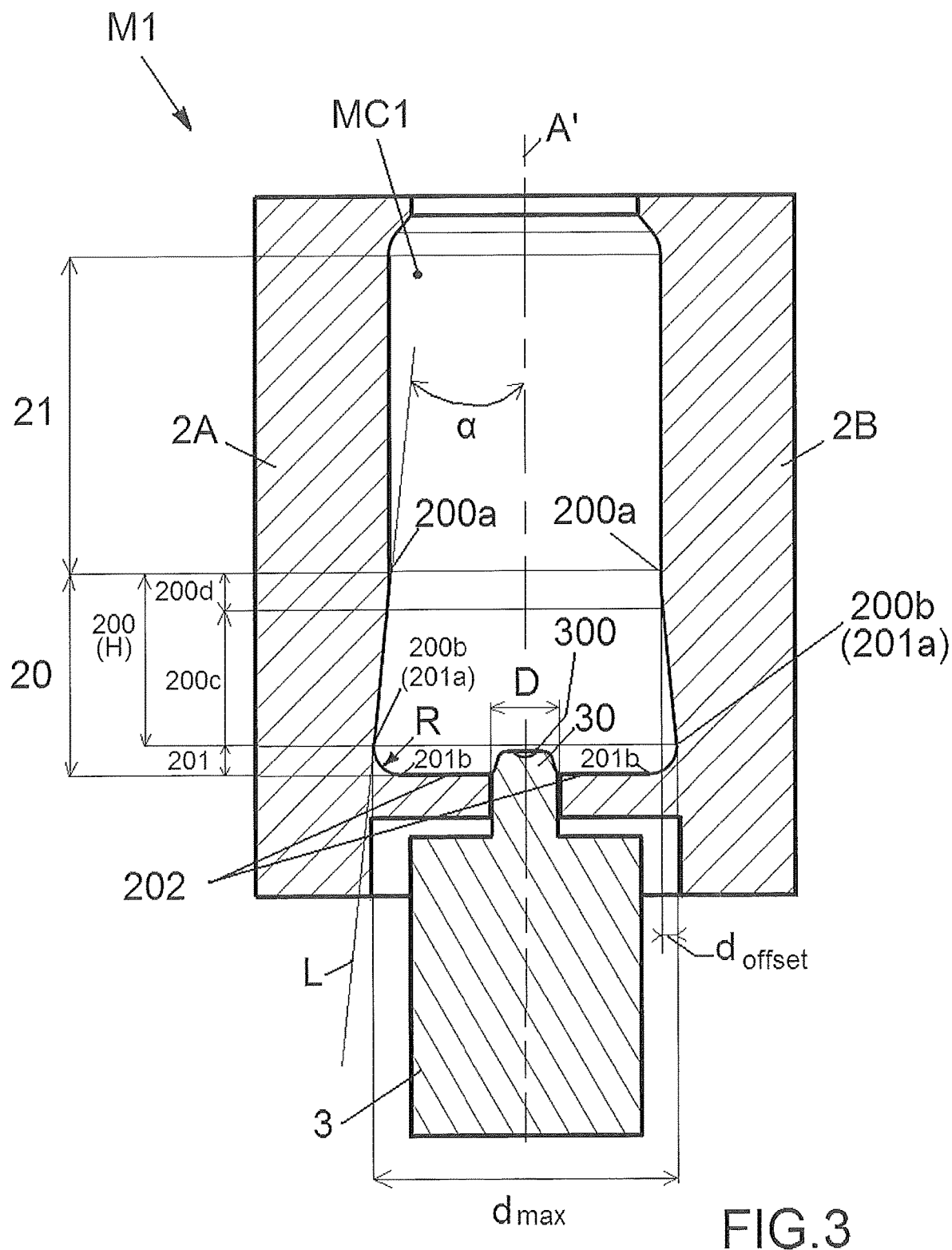
FIG. 3 is a longitudinal cross section view of a first variant of a primary blow mold of the invention.

Referring now to FIG. 3, the primary blow mold M1 used as first blow mold in the double-blow molding process comprises a mold cavity MC1 having a vertical central axis A', and defined by the inner molding surfaces of a pair of mold halves 2A and 2B and by a protruding centering portion 30 of a base mold 3.

Mold halves 2A and 2B are knowingly provided with heating means (not shown), for example electric heating means, in order to heat up their inner molding surfaces to a set up and controlled temperature. The base mold 30 is also knowingly provided with heating means (not shown), for example heating means using a heating fluid like oil, in order to heat up the protruding centering portion 30 to a set up and controlled temperature that can be different than or equal to the temperature of the mold halves 2A, 2B.

Figure 5:
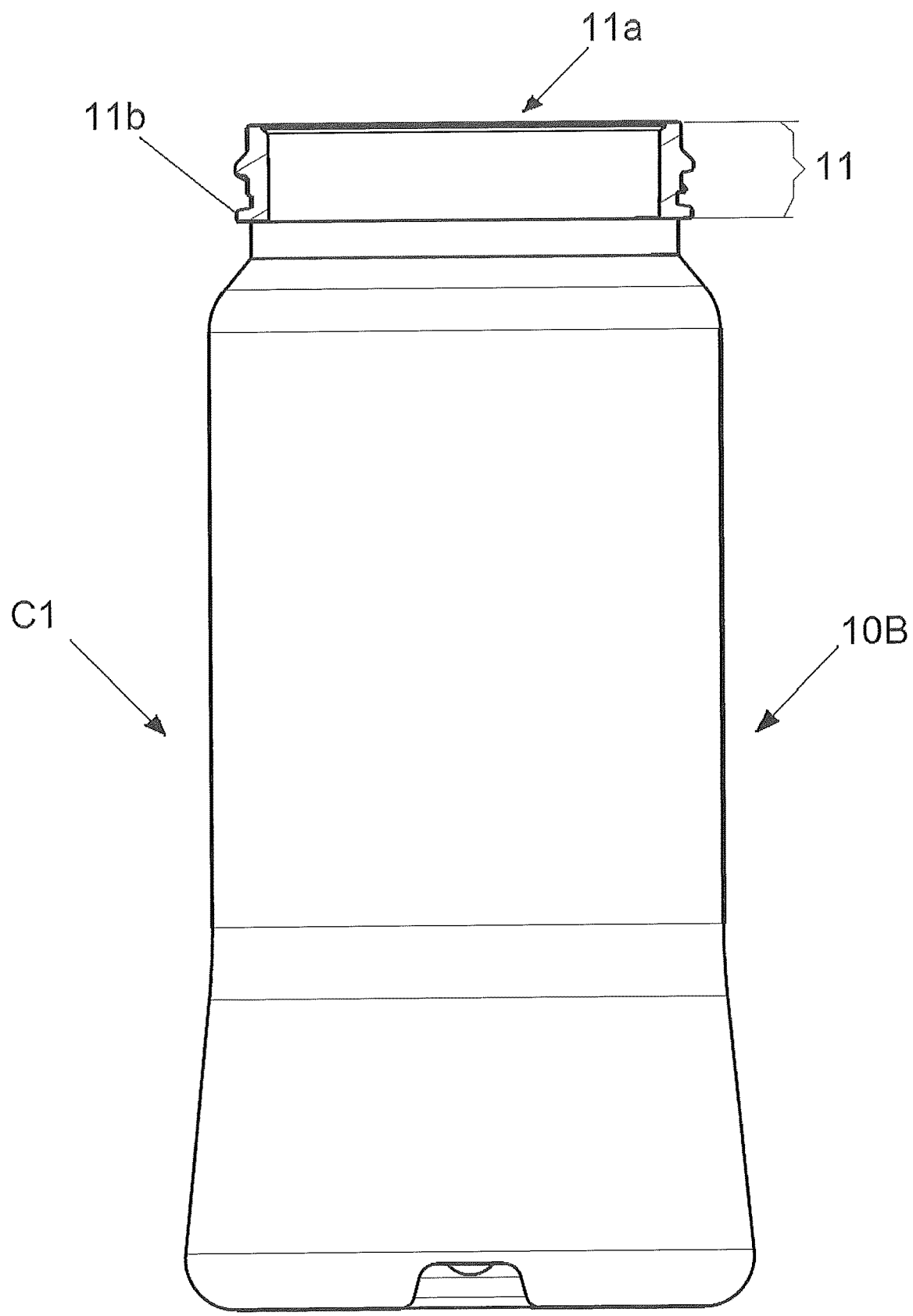
FIG. 5 shows an example of primary container that has been obtained by biaxially stretch blow molding the preform of FIG. 2 in the primary blow mold of FIG. 3.

The mold cavity MC1 of the primary blow mold M1 comprises an upper cylindrical molding portion 21 and a bottom molding portion 20, that is used for molding the bottom portion of a primary biaxially stretched container C1 shown on FIG. 5, including the base of said container C1.

Said bottom molding portion 20 of the mold cavity is formed of a non-cylindrical sidewall 200, a concave transition wall 201 of radius R where the transverse cross section of the mold cavity MC1, measured in a plan perpendicular to the central axis A', is the largest, and a bottom wall 202 transverse to the central axis A'. This bottom wall is formed by a bottom part of each mold half 2A, 2B.

The non-cylindrical sidewall 200 is an extension of the cylindrical upper molding portion 21 and is forming a lateral molding surface centered on central axis A'.

The value of the radius R of the concave transition wall 201 is not limiting the invention. Preferably however, but not necessarily, this concave radius R can be at least 4 mm, and more particularly at least 7 mm.

In the particular example of FIG. 3, the bottom wall 202 is a flat wall perpendicular to the axis A', but within the scope of the invention bottom wall 202 could have any other profile, and is not necessarily flat.

The sidewall 200 is transitioning on its whole periphery to the bottom wall 202 along said concave transition wall 201 of radius R.

The transverse cross section of the non-cylindrical sidewall 200, measured in a plan perpendicular to the central axis A', is the largest at the transition point 200b/201a with the concave transition wall 201.

More particularly, in this example, the transverse cross section of the sidewall 200, in a plan perpendicular to central axis A', is increasing continuously from its upper end 200a towards its lower end 200b at the transition with said concave transition wall 201.

More particularly, in the particular example of FIG. 3, the non-cylindrical sidewall is constituted by a lower main portion 200c and a small upper transitional portion 200d that is slightly convex. The lower main portion 200c is transitioning to the cylindrical upper molding portion 21 along said upper convex transitional portion 200d.

The profile in longitudinal cross section of the lower main portion 200c of the sidewall 200, in a plan parallel to the central axis A', is substantially flat.

In this example, the lower main portion 200c of the sidewall 200 can form a molding surface of revolution centered on the central axis A', and in particular a frustroconical molding surface having its apex oriented upwardly. The lower main portion 200c of the sidewall 200 can also form a pyramidal molding surface of any polygonal transverse cross section, including notably square shape, rectangular shape, hexagonal shape and octagonal shape.

More particularly, the non-cylindrical sidewall 200 is smoothly transitioning to the concave transition wall 201 without any convex radius at the transition between the sidewall portion 200 and the concave transition wall 201.

In the particular example of FIG. 3, but not necessarily, the concave transition wall 201 is smoothly transitioning to the bottom wall 202 without any convex radius at the transition between the concave transition wall 201 and the bottom wall 202.

In reference to FIG. 3, the offset distance $d_{offset}$ is the distance measured, in a plan perpendicular to the central axis A', between:

the upper end 200a of the non-cylindrical sidewall 200 at the transition with the upper cylindrical molding portion 21, and an outermost point of the concave transition wall 201 where the transverse cross section (dmax) of the bottom molding portion 20, measured in a plan perpendicular to the central axis A', is the largest.

Pursuant to the invention, the offset distance $d_{offset}$, is at least 2 mm, preferably at least 3 mm and more preferably at least 4 mm.

The offset distance $d_{offset}$ depends notably on the volume of the final container 1. The larger the final container is, the larger the offset distance $d_{offset}$ offset will be. By way of examples only:

for a 370 ml container 1, the offset distance $d_{offset}$ offset can be 2 mm;

for a 720 ml container 1, the offset distance $d_{offset}$ can be 4 mm.

The slope angle of the non-cylindrical sidewall 200 is defined as the angle α measured, in a longitudinal cross section plan parallel to the central axis A', between the central axis A' and a straight line L including the upper end 200a and the lower end 200b of the non-cylindrical sidewall 200.

Figure 4:
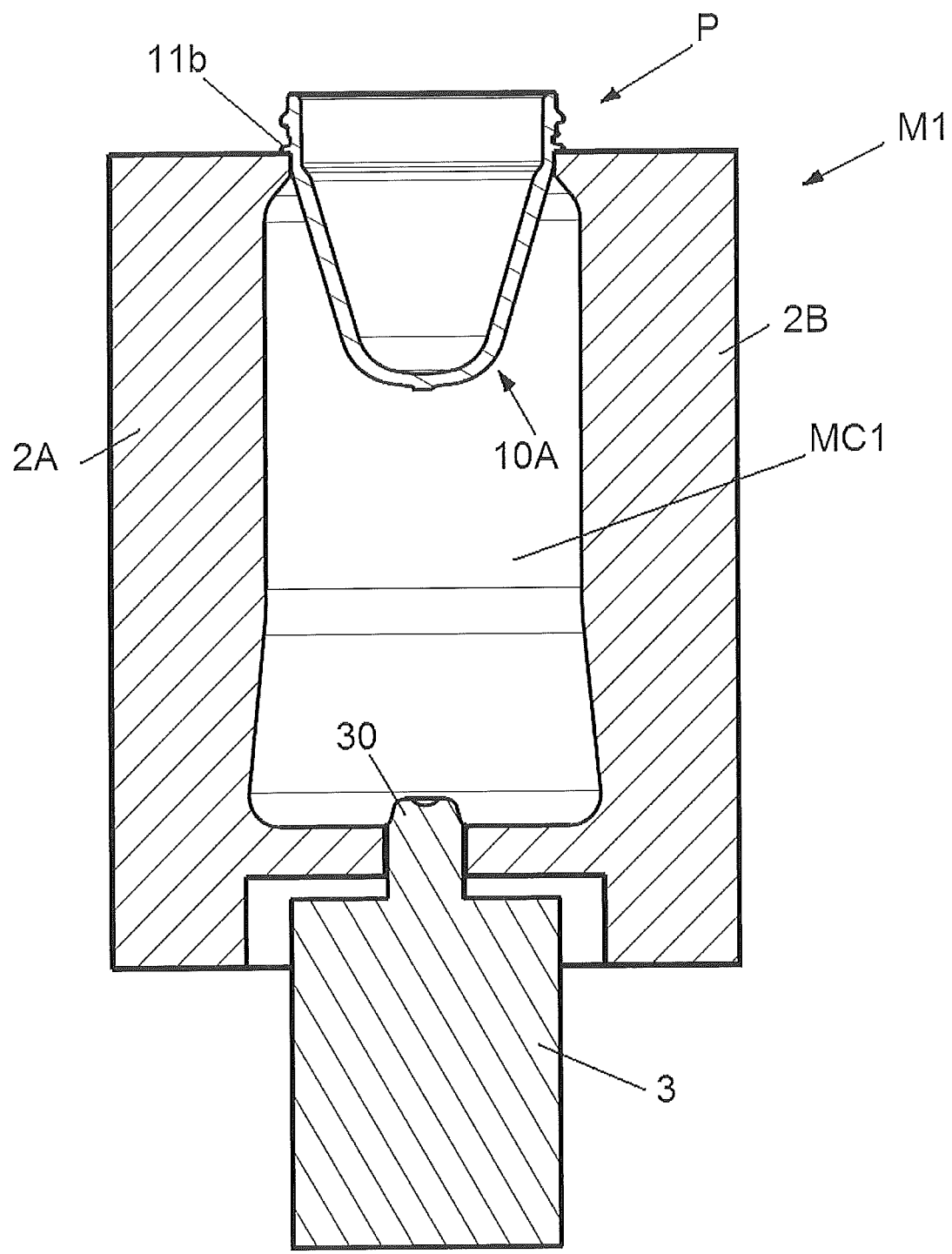
FIG. 4 is a longitudinal cross section view of the preform of FIG. 2 positioned in the primary blow mold of FIG. 3.

In the particular example of FIGS. 3 and 4, the angle α is also substantially equal to the conical angle of the lower main portion 200c of the sidewall 200.

Pursuant to the invention, this slope angle α is not less than 3°, and preferably not less than 5°.

The slope angle α is depending on the volume of final container 1. By way of examples only:

for a 370 ml container 1, the slope angle α can be 18°;

for a 720 ml container 1, the slope angle α can be 5°.

The height H of the non-cylindrical sidewall 200 is depending notably on the volume of final container 1, and is in most cases at least 10 mm, and more preferably at least 25 mm.

The protruding centering portion 30 of the mold base 3 protrudes through the bottom wall 202 inside the mold cavity MC1 and forms a dome inside the mold cavity MC1.

The apex 300 of this dome shape protruding centering portion 30 is the top part thereof.

The maximum diameter D of this protruding centering portion 30 is preferably not more than 30 mm, preferably not more than 28 mm, more preferably not more than 27 mm, even more preferably not more than 25 mm, and even more preferably not more than 20 mm.

The heat resistant biaxially stretched plastic container 1 of FIG. 1 can be manufactured by double-blow molding the preform P of FIG. 2 as follows.

The preform P is conveyed through a preheating oven to knowingly produce a desired temperature profile within the preform. For a PET preform P, the pre-heating of the preform P can be for example between 90° C. and 120° C.

When at the proper temperature, the preform P is transferred to the primary blow mold M1 whose mold cavity MC1 is being heated above the Tg of the preform.

By way of example only, for a PET preform P, the two mold halves 2A, 2B of the primary blow mold M1 can be heated up to a temperature of at least about 140° C., and preferably around 180° C.; the base mold 3 of the primary blow mold M1 can be heated up to a temperature around 120° C.-130° C. to avoid sticking problem when removing the container from the mold cavity.

In reference to FIG. 4, the preform P is positioned in the blow mold M1 in such a way that it is supported and retained in the blow mold M1 by its neck support ring 11b and that the body 10A (below the neck support ring 11b) of the preform P is inside the mold cavity MC1.

Once positioned in the heated primary blow mold M1, the body 10A of the preform P is knowingly biaxially stretch blow-molded (in axial direction and in a radial direction) inside the cavity mold MC1 in order to form a primary biaxially stretched container C1 shown on FIG. 5, and having a body 10B of higher volume and shaped by the inner heated molding surface of the mold cavity MC1. The neck finish 11 is used for maintaining the preform in the blow mold M, and is thus not stretched. This biaxially stretch blow-molding can be knowingly achieved by means of a stretch rod and air introduced under pressure inside the preform P.

As the heating temperature (120° C.-130° C.) of the base mold 3 is lower than the heating temperature (around 180° C.) of the pair of mold halves 2A, 2B, the portion of the container base molded by the protruding centering portion 30 of the base mold 3 has a lower crystallinity than the remaining portion of the container base molded by the bottom parts of the pair of mold halves 2A, 2B forming the bottom wall 202 of the mold cavity MC1. By using a protruding centering portion 30 having a small transverse dimension (D) of not more than 30 mm, the portion of the base having the lowest crystallinity is advantageously reduced, which reduces the stretching of the base of the final container 1, and improves the resistance to shrinkage of the base of the final container 1 when hot filled Once the primary biaxially stretched container C1 is formed, it is subsequently submitted to a shrinking step.

This shrinking step is performed inside the primary blow mold M1, by releasing the air pressure inside the container C1, and by holding the primary biaxially stretched container C1 inside the heated primary blow mold M1, for a sufficient length of time (for example not more than 1s) to obtain the required shrinkage.

Figure 6:
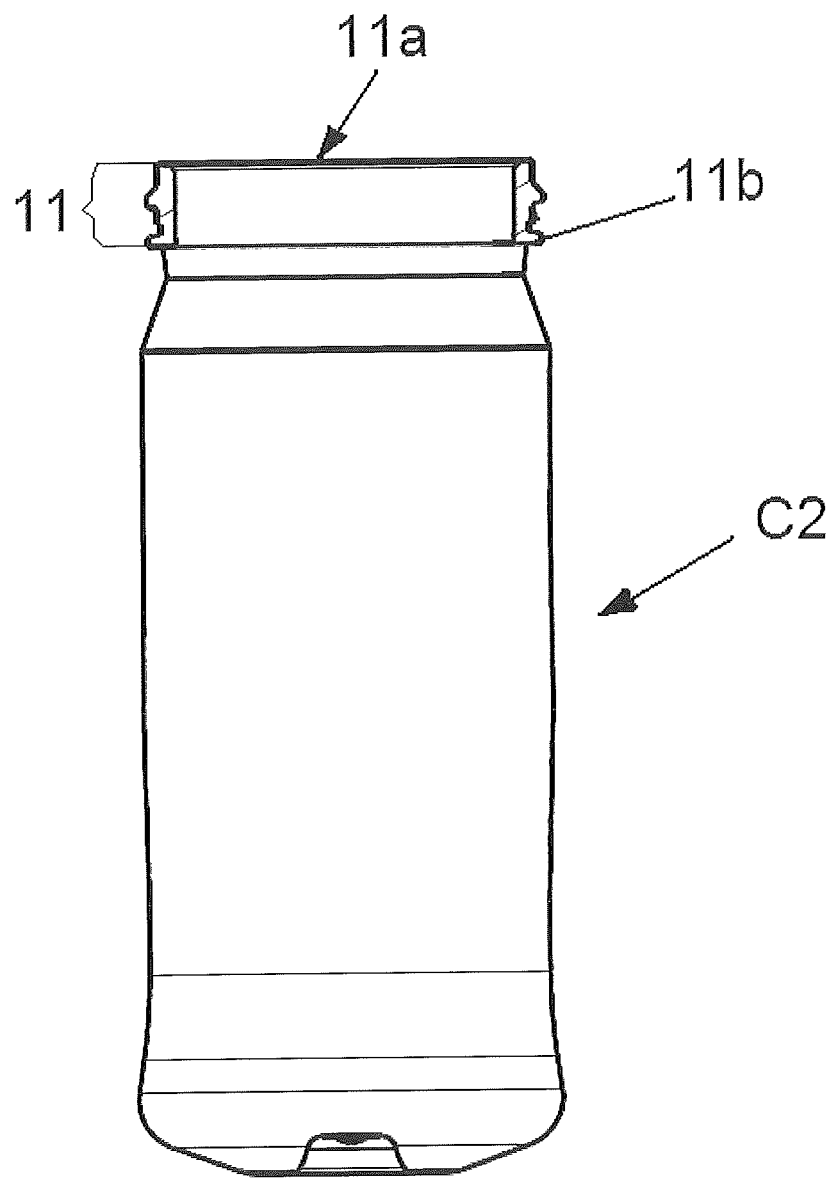
FIG. 6 shows an example of secondary shrunk container that is obtained after shrinkage of the primary biaxially stretch blow molded container of FIG. 5.

A secondary shrunk container C2 of slightly smaller volume (shown on FIG. 6) is thus obtained. The shrinkage releases orientation stresses in the container C2. Then the shrunk container C2 is transferred, without being reheated to secondary blow mold M2 (FIG. 7) for being re-blown.

In another variant, the shrinking step can be performed outside the primary blow mold M1. In such a case the primary biaxially stretched container C1 is transferred to a heat treating oven. In this oven, the applied heat causes the primary biaxially stretched container C1 to undergo a significant degree of shrinkage, and form the secondary shrunk container C2.

The volume of this secondary shrunk container is slightly smaller than the volume of the final container, and the secondary shrunk container C2 is knowingly re-blown in the secondary blow mold M2, in order to form the heat resistant biaxially stretched container 1 of slightly larger volume that is shown on FIG. 1.

Referring to FIG. 7, the secondary blow mold M2, used as second blow mold in the double-blow molding process, comprises mold a cavity MC2 having a vertical central axis A'', and defined by the inner molding surfaces of a pair of mold halves 4A and 4B and by the top face 50 of a base mold 5, including a protruding centering portion 50a similar to the protruding centering portion 30 of first blow mold M1.

Mold halves 4A and 4B are knowingly provided with heating means (not shown), for example for example heating means using a heating fluid like oil, in order to heat up their inner molding surfaces to a set up and controlled temperature. The base mold 5 is also knowingly provided with heating means (not shown), for example heating means using a heating fluid like oil, in order to heat up the top face 50 of a base mold 5, including the protruding centering portion 50a, to a set up and controlled temperature that can be different than or equal to the temperature of the mold halves 4A, 4B.

By way of example only, for a PET container, the two mold halves 4A, 4B of the secondary blow mold M2 can be heated up to a temperature of at least about 140° C., and are preferably heated up to a temperature around 140° C.; the base mold 5 of the secondary blow mold M2 can be heated up to a temperature around 120° C.-130° C.

In the particular example of FIGS. 7 to 9, the base mold 50 is movable axially between a lower position shown on FIG. 7 and an upper position shown on FIG. 9.

During the second blow molding step inside the secondary blow mold M2, in first sub-step, the secondary shrunk container C2 is first re-blown inside the mold cavity MC2, with the base mold 50 in the lower position, in order to mold the intermediate container C3 of FIG. 8. Then, in second sub-step, the base mold 50 is actuated to move from the lower position of FIG. 8 to the upper position of FIG. 9, in order to box inwardly the base of the intermediate container C3, and form the base 101 of the final container 1.

Figure 10:
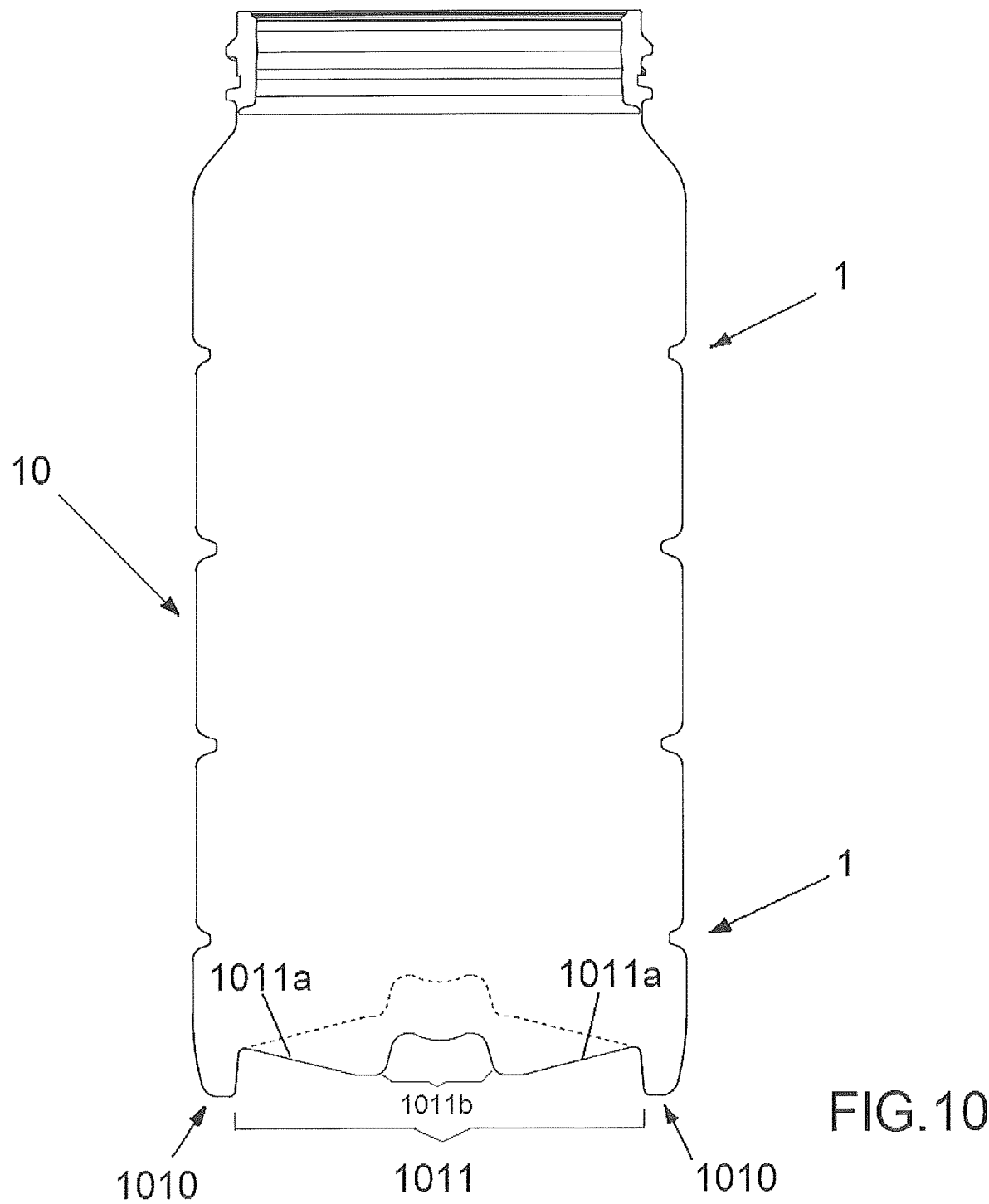
FIG. 10 is a longitudinal cross section view shows of the final container of FIG. 1 showing the good mobility of the movable base thereof.

In reference to FIG. 10, the base 101 of the final container is deformable inwardly (phantom lines) to absorb the vacuum pressure inside the container, when hot filled, without causing unwanted deformation in the other portions of the container 1.

More particularly, this base 101 comprises a heel portion 1010 forming a contact ring for stably supporting the container 1 in upright position on a flat surface. The base 101 also comprises a central movable wall portion 1011 surrounded by the heel portion and comprising a movable wall 1011a and a central push-up portion 1011b.

In this variant, the movable wall 1011a forms substantially a frustroconical wall.

When the container 1 is removed from the secondary mold M2, the apex of said substantially frustroconical wall 1011a is oriented towards the outside of the container 1 (see FIG. 10/straight line).

Once the container is hot filled with a hot liquid or the like, then is capped and cooled down, the vacuum pressure generated inside the container 1 make the movable wall portion 1011 move up towards the inside of the container, in order to automatically reduce the container volume and accommodate such vacuum pressure, without unwanted deformation of the container body 10. In this particular embodiment, the frustroconical wall 1011a is inverted under the vacuum pressures, the apex (FIG. 10/phantom line) of the deformed frustroconical wall 1011a being oriented towards the inside of the container 1.

The biaxially stretched blow-molded container 1 issued from said double-blow process is heat resistant and can be hot filled without unwanted deformation or can be sterilized in pasteurization process or in retort process, without significant shrinking of the container 1. It has to be outlined that thanks to the invention, the deformation, induced by shrinking, of the base of aforesaid primary biaxially stretched plastic container C1, leads to the formation of an improved shrunk base (container C2), whose dimension and geometry can be close to the dimension and geometry of the mold cavity MC2 of a secondary blow mold M2 of the double-blow process, and can thus significantly reduces the stretching of this shrunk base inside the secondary mold M2. The base 101 of the final container 1 is thus less subjected to a shrinking phenomenon when hot filled and is more stable, and in the best case does not shrink at all.

More particularly, in case of a container 1 having a movable base to accommodate vacuum pressure when hot filled, if said base 101 was shrinking too much, such a significant shrinkage would already move up the movable wall 1011a and central push-up portion 1011b in the final container (before being hot filled), thereby dramatically, and in the worst case loosing, the capability of said movable base to absorb vacuum. With the invention, the low shrinkage of the base 101 of the container 1 allows to maintain a movable wall 1011 substantially in its position of FIG. 10 (straight lines) with the apex of substantially frustroconical wall 1011a being oriented towards the outside of the container 1. The capability of the movable base 101 to accommodate vacuum pressure inside the container 1 when hot filled is thus fully preserved.

Figure 11:
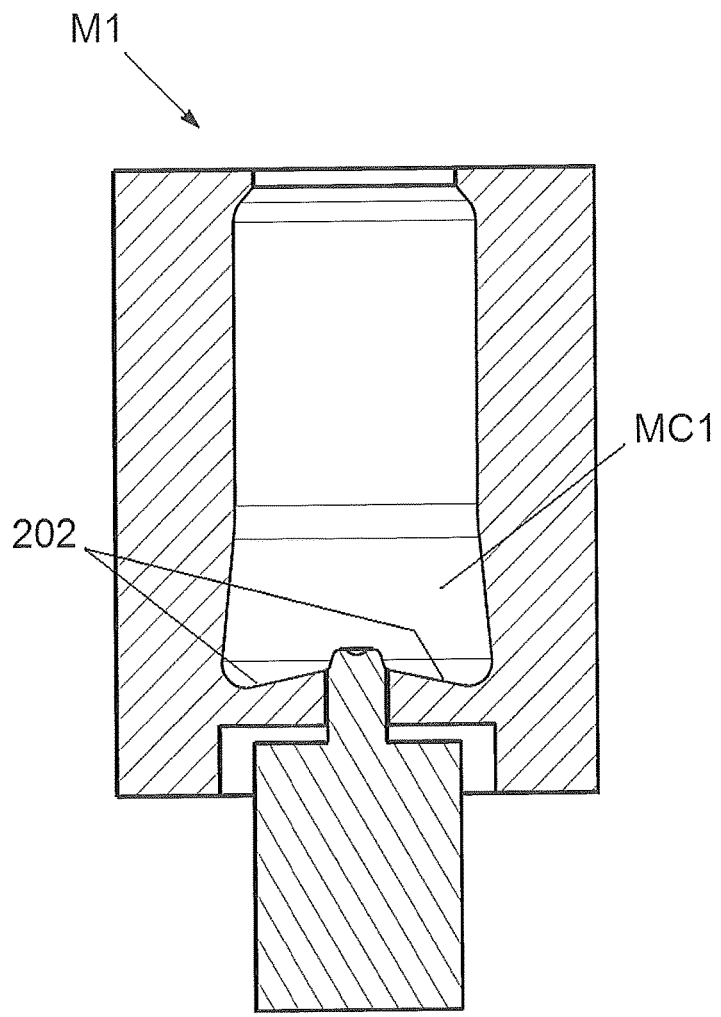
FIG. 11 is a longitudinal cross section view of a second variant of a primary blow mold of the invention.
Figure 12:
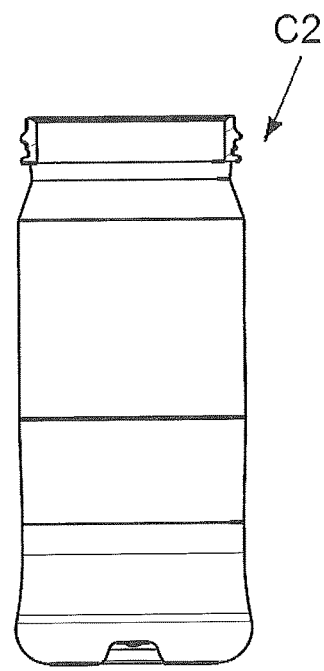
FIG. 12 shows an example of secondary shrunk container that is obtained after shrinkage of a primary container, which primary container has been obtained by biaxially stretch blow molding the preform of FIG. 2 in the primary blow mold of FIG. 11.

FIG. 11 shows another example of primary mold M1, wherein the bottom wall 202 is not flat, but is frustroconical with its apex oriented upwardly towards the inside of the mold cavity MC1. FIG. 12 shows the secondary shrunk container C2 that is obtained from a primary container that has been biaxially stretch blow molded in the mold cavity MC1 of FIG. 11, after shrinkage of said primary container. The shrinkage of the base of primary container forms a substantially flat base in the secondary shrunk container C2.

Figure 13:
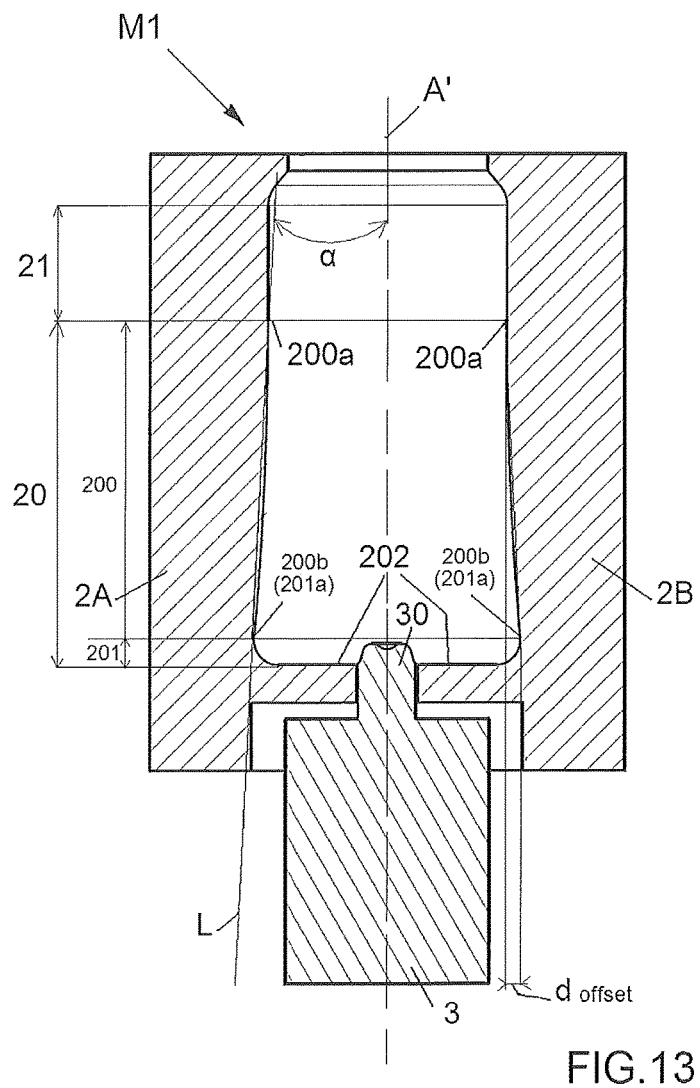
FIG. 13 is a longitudinal cross section view of a third variant of a primary blow mold of the invention.
Figure 14:
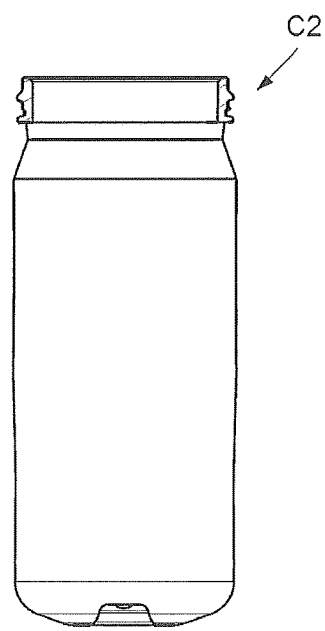
FIG. 14 shows an example of secondary shrunk container that is obtained after shrinkage of a primary container, which primary container has been obtained by biaxially stretch blow molding the preform of FIG. 2 in the primary blow mold of FIG. 13.

FIG. 13 shows another example of primary mold M1, wherein the sidewall 200 is not flat in longitudinal cross section but is slightly convex. FIG. 14 shows the secondary shrunk container C2 that is obtained from a primary container that has been biaxially stretch blow molded in the mold cavity MC1 of FIG. 13, after shrinkage of said primary container.

Figure 15:
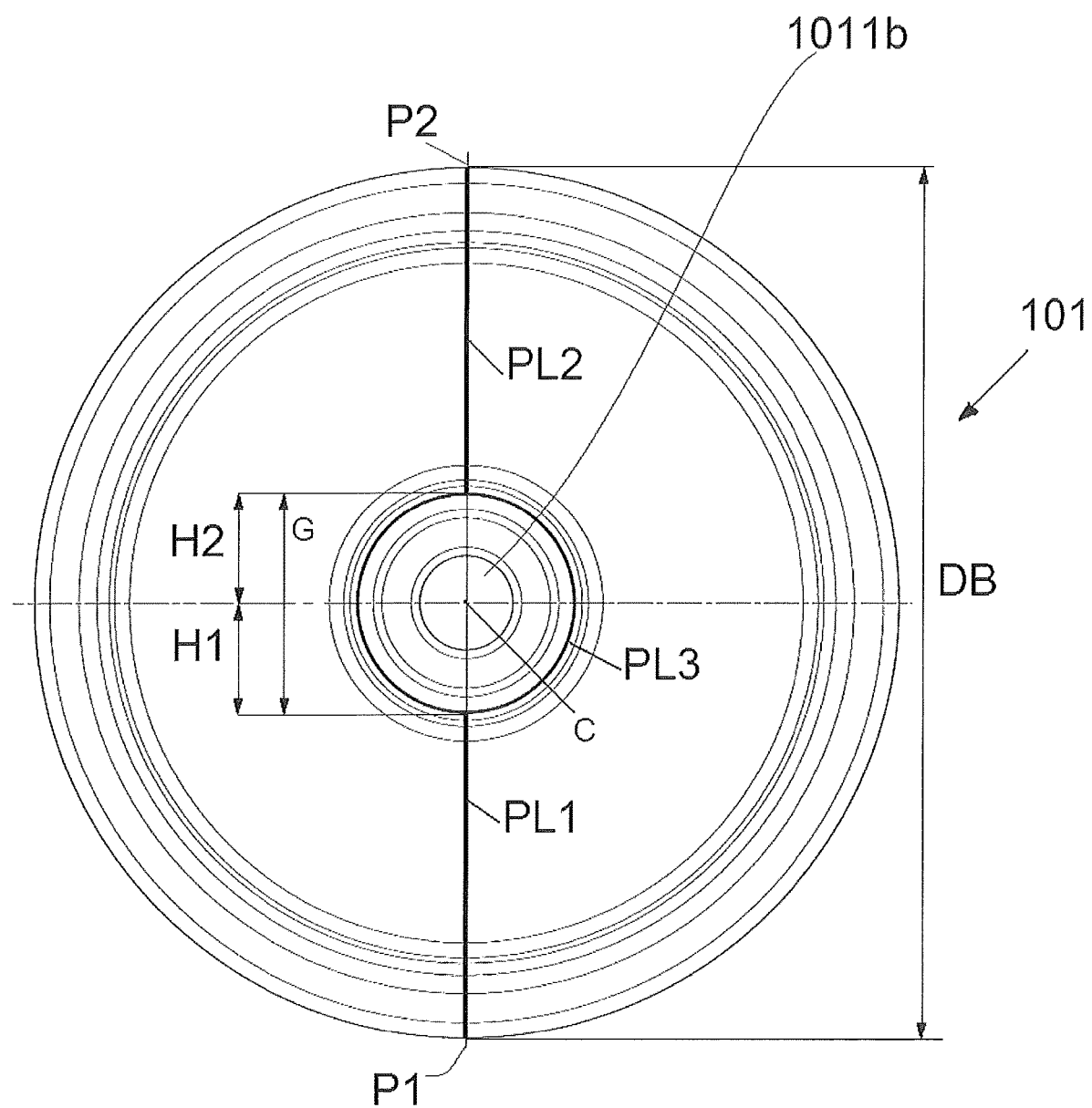
FIG. 15 is a bottom view of an example of heat resistant and biaxially stretched blow-molded plastic container issued from a double-blow process.

In reference to FIG. 15, the base 101 of the final heat resistant and biaxially stretched blow-molded plastic container 1 issued from a double-blow process comprises a two straight parting lines PL1, PL2 extending radially on opposite sides of the central pushup portion 1011b and aligned with the center C of the central pushup portion 1011b (i.e. center of the base 101), and a substantially circular parting line PL3. These parting lines PL1, PL2, PL3 are knowingly formed in the container base 101, during the first blow molding step in the primary mold M1. More particularly, the two straight parting lines PL1, PL2 are formed in the contact plane between the two mold halves 2A, 2B of the primary mold M1, and the circular parting line PL3 is formed at the interface between the base mold 3 and the two mold halves 2A, 2B.

These parting lines PL1 and PL2 formed in the container base in the contact plane between the two mold halves 2A, 2B of the primary mold M1 are not necessarily straight lines. More generally, these parting lines PL1 and PL2 are extending in the container base on opposite sides of the push-up portion 1011b towards the outer periphery of the container base. These parting lines PL1, P12 are further extended upwardly in the container wall.

These two parting lines are actually starting substantially from the circular parting line PL3. Due to the stretching of the container base in the secondary mold M2, the shortest distance H1, H2 between each parting line PL1, PL2 and the center C of the central pushup portion 1011b (i.e. center of the base 101) has increased and is higher in the base 101 of the final heat resistant and biaxially stretched blow-molded plastic container 1 issued from the double-blow process.

In the example of FIG. 15, the circular parting line PL3 is still centered around the center C of the central pushup (i.e. center of the base 101), and the shortest distance H1 between this center C and parting line PL1 is equal to the distance H2 between this center C and the other parting line PL2.

Figure 16:
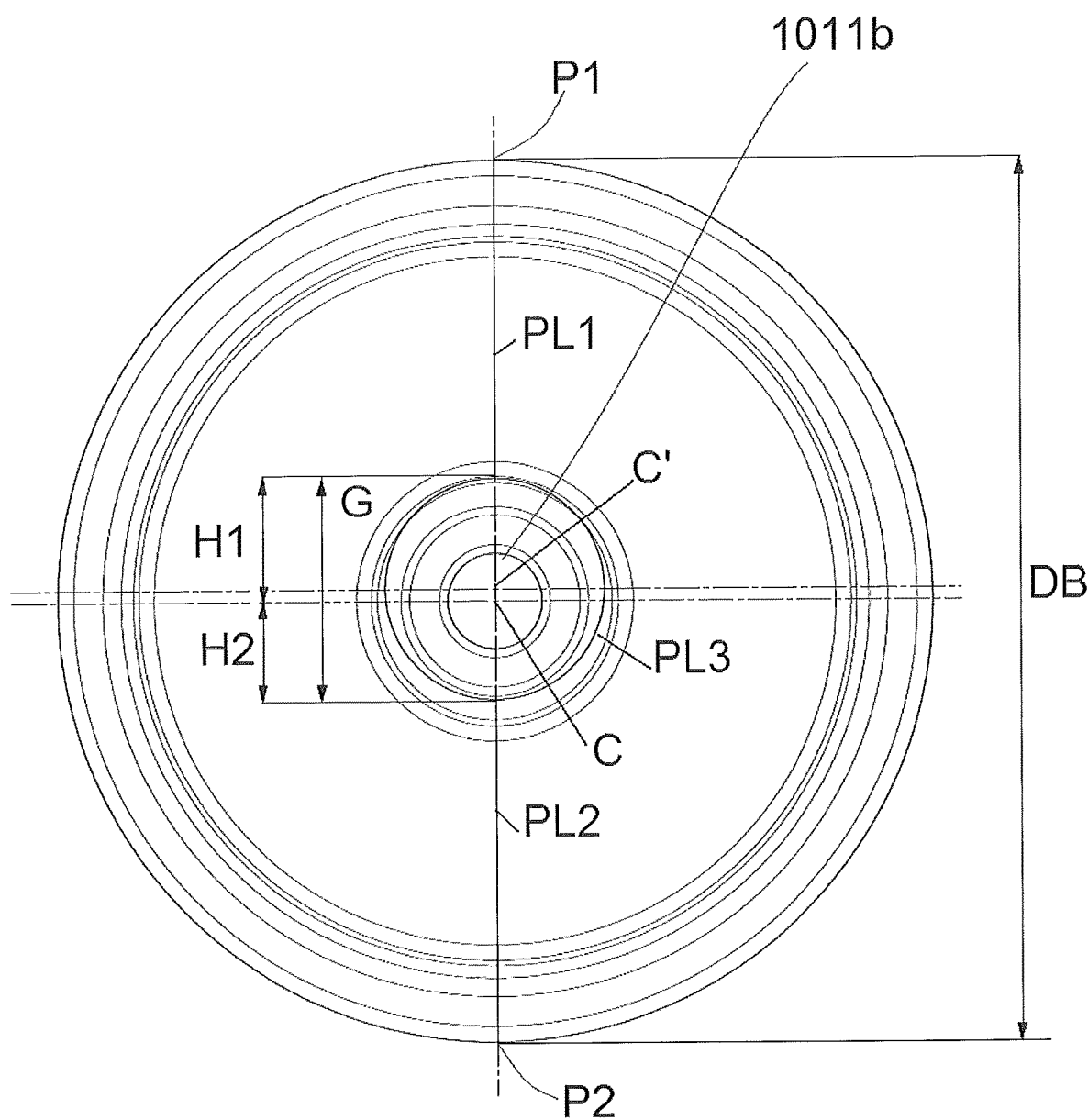
FIG. 16 is a bottom view of another example of heat resistant and biaxially stretched blow-molded plastic container issued from a double-blow process.

In other variants, when a final heat resistant and biaxially stretched blow-molded plastic container 1 issued from the double-blow process container 1 is being produced, due to a non-symmetrical stretching of the container base, the circular parting line PL3 can be off-centered, as depicted on the example of FIG. 16 wherein C' is the center of the circular parting line PL3. The shortest distance H1 between the center C of the container base and parting line PL1 can be slightly different than the shortest distance H2 between the center C of the container base and the other parting line PL2.

In other variants, the parting line PL3, that is formed at the interface between the base mold 3 and the two mold halves 2A, 2B and that surrounds the push-up portion 1011b, is not necessarily circular, but can form a closed contour of any geometry.

The push portion 1010b formed by the protruding centering portion 30 of the base mold 3 is not necessarily central and the parting lines PL1, PL2 are preferably, but not necessarily, aligned with the center of the container base. In another variant, the push-up portion 1010b can be off-center.

Within the scope of the invention, the base 101 of the biaxially stretched blow-molded container can have any shape and any size. This base 101 is not necessary circular as depicted on FIGS. 15 and 16 but can have any other shape, including notably oval shape or any polygonal shape, including notably square shape, rectangular shape, hexagonal shape, octagonal shape.

Different types (A to K) of heat resistant and biaxially stretched blow-molded PET containers 1 issued from a double-blow process have been produced. For each container the distances H1 and H2 were measured. In this table, the maximum value Max(H1, H2) between H1 and H2 is also reported. The diameter D of the protruding centering portion 30 of the mold base 3 of the primary mold M1 and the transverse dimension DB (FIG. 15 and FIG. 16) of the container base 101 measured between the two outermost points P1, P2 (see FIG. 15 or FIG. 16) of the parting lines PL1, PL2 are also reported. When the parting lines PL1, PL2 are more particularly straight lines as depicted on FIG. 15 or 16, the transverse dimension DB of the container base 101 measured between the two outermost points P1, P2 is actually measured along the straight parting lines PL1, PL2.

| Ref | Name | diameter D (Primary Mold M1) (mm) | Base diameter DB (mm) | G = H1 + H2 (mm) | Max (H1, H2) (mm) | G/DB |
|---|---|---|---|---|---|---|
| A | 385 ml Octagonal | 40 | 79 | 45.5 | 24.5 | 57.59% |
|   |   |   |   | 45.5 | 24.5 | 57.59% |
|   |   |   |   | 46.5 | 23.4 | 58.86% |
|   |   |   |   | 45 | 23 | 56.96% |
|   |   |   |   | 45 | 23 | 56.96% |
|   |   |   |   | 47 | 24 | 59.49% |
|   |   |   |   | 44 | 22 | 55.70% |
|   |   |   |   | 42 | 22 | 53.16% |
|   |   |   |   | 46 | 23 | 58.23% |
|   |   |   |   | 46 | 24 | 58.23% |
|   |   |   |   | 47 | 24 | 59.49% |
|   |   |   |   | 54 | 29 | 68.35% |
| B | 375 ml Compact | 40 | 80 | 43 | 22 | 53.75% |
|   |   |   |   | 45 | 23 | 56.25% |
|   |   |   |   | 45 | 23 | 56.25% |
|   |   |   |   | 45.5 | 23.5 | 56.88% |
| C | 375 ml Compact | 18 | 70 | 22 | 12.5 | 31.43% |
|   |   |   |   | 21 | 10.6 | 30.00% |
|   |   |   |   | 20.6 | 11 | 29.43% |
|   |   |   |   | 21.7 | 11 | 31.00% |
|   |   |   |   | 20 | 10.7 | 28.57% |
|   |   |   |   | 22 | 11.2 | 31.43% |
|   |   |   |   | 22 | 11.3 | 31.43% |
|   |   |   |   | 22.8 | 11.4 | 32.57% |
| D | 375 ml Compact | 28 | 80 | 32 | 17 | 40.00% |
|   |   |   |   | 33 | 17 | 41.25% |
|   |   |   |   | 33 | 17 | 41.25% |
|   |   |   |   | 34 | 18 | 42.50% |
|   |   |   |   | 32 | 16 | 40.00% |
|   |   |   |   | 32 | 16 | 40.00% |
|   |   |   |   | 32.5 | 17 | 40.63% |
|   |   |   |   | 32.5 | 17.5 | 40.63% |
| E | 476.5 ml Stromboli | 18 | 75.8 | 21.5 | 12 | 28.36% |
|   |   |   |   | 21.5 | 12 | 28.36% |
| F | 544 ml Visuvius | 40 | 71.75 | 42.5 | 22 | 59.23% |
|   |   |   |   | 43 | 22 | 59.93% |
| G | 544 ml Visuvius | 19 | 71.75 | 22 | 11 | 30.66% |
|   |   |   |   | 23 | 12 | 32.06% |
|   |   |   |   | 24.5 | 12.5 | 34.15% |
| H | 720 ml ASB | 40 | 85.5 | 47.5 | 25 | 55.56% |
| I | 720 ml Tall | 40 | 85.5 | 47 | 24 | 54.97% |
|   |   |   |   | 47 | 24 | 54.97% |
| J | 720 ml Tall | 19 | 85.5 | 22.5 | 11.5 | 26.32% |
|   |   |   |   | 24 | 14 | 28.07% |
|   |   |   |   | 23.5 | 12.5 | 27.49% |
| K | 720 ml Tall | 28 | 85.5 | 34 | 19 | 39.77% |
|   |   |   |   | 33 | 16.5 | 38.60% |
|   |   |   |   | 34 | 18 | 39.77% |

Figure 17:
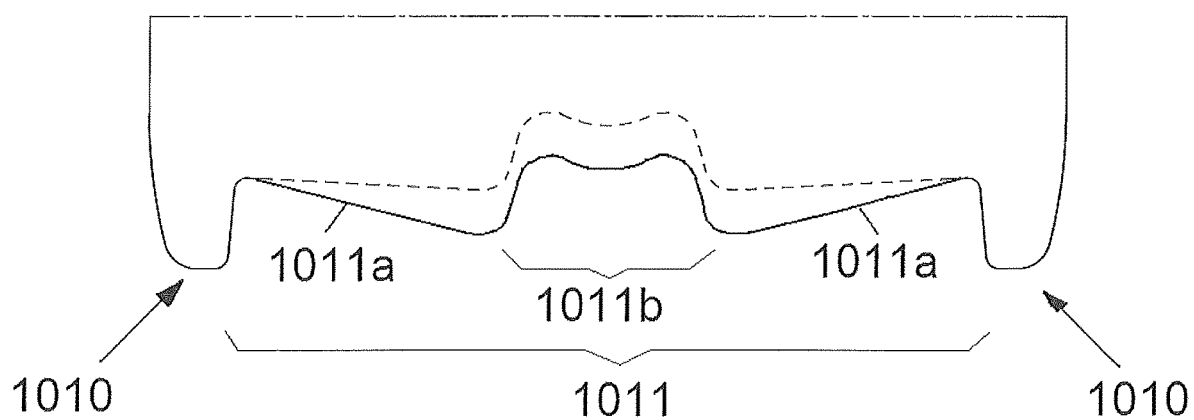
FIG. 17 is a partial longitudinal cross section view of a the base of a heat resistant and biaxially stretched blow-molded plastic container issued from a double-blow process, said base having a poor mobility for absorbing vacuum.

The bases 101 of the containers A, B, F, H and I, with higher gap G (G=H1+H2) between the parting lines PL1 and PL2, were actually subjected to a significant shrinking when the container is being hot-filled. Such shrinking was causing an important move up of the movable wall 1011a and central push-up portion 1011b in the final container (after being hot filled), as depicted on FIG. 17, thereby dramatically reducing, and in the worst case loosing, the capability of said movable base to absorb vacuum when the container is being hot filled.

The base of the other containers C, D, E, G, J and K with smaller gap G (G=H1+H2) between the parting lines PL1 and PL2, were advantageously subjected to a very low shrinking, when the container is being hot-filled. This very low shrinking was causing only a small move up of the movable wall 1011*a* and central push-up portion 1011*b* in the final container, as depicted on FIG. 10, thereby preserving the capability of said movable base 101 to absorb vacuum.

These results can be explained by a low stretching of the container base in the secondary mold M2 base combined with a higher crystallinity of the container base. This higher crystallinity of base of containers C, D, E, G, J and K can be explained by the fact that the diameter D of the protruding centering portion 30 of the mold base 3 of the primary mold M1 for these containers is smaller, and the region of the container base in contact with the mold halves 2A, 2B of higher temperature in the primary mold M1 is thereby more important for containers C, D, E, G, J and K than for containers A, B, F, H and I.

Consequently, pursuant to an aspect of the invention, it has thus been found that a heat resistant and biaxially stretched blow-molded plastic container 1 issued from a double-blow process and having a movable base 101 to absorb vacuum that is characterized by a small gap G between the parting lines PL1 and PL2 (or a small distance H1, H2 between the center C of the base and each parting line PL1 and PL2) is preferred, because such a base is less subjected to shrinkage and keeps a very good capability to absorb vacuum.

More particularly, the experiments have shown that in order to keep a very good capability to absorb vacuum, it was preferred to practice at least one of the following characteristics for the heat resistant and biaxially stretched blow-molded plastic container issued from a double-blow process:

(i) the distance (H1; H2) between each parting line PL1, PL2 and the center C of the base is not more than 20 mm, and/or (ii) the distance G between the two parting lines PL1, PL2 is not more than 40 mm, and/or (iii) the distance G between the two parting lines PL1, PL2 is less than 50% of the transverse dimension DB of base 101 measured between the two outermost points P1, P2 of the parting lines PL1, PL2.

The invention claimed is:

1. A heat-resistant and biaxially stretched blow-molded plastic container produced via a double-blow process, the container comprising a base movable inwardly from an original state to a deformed state to accommodate vacuum forces generated within the container, thereby decreasing a volume of the container, wherein the base includes a movable wall that comprises a push-up portion, first and second parting lines that are separated from one another by a gap, and the first and second parting lines extend on opposite sides of the push-up portion, and at least one or more of the following:
  (i) a distance between each parting line and a center of the base is not more than 20 mm;
  (ii) a distance between the first and second parting lines is not more than 40 mm; and/or
  (iii) a distance between the first and second parting lines is less than 50% of a transverse dimension of the base measured between the two outermost points of the parting lines; and a substantially circular third parting line; wherein the first, second, and third parting lines are formed in the base during a first blow molding step; and wherein mold halves producing the first, and second parting lines heat portions of the base at a first temperature, a portion of the base heated by a protruding centering portion is heated at a second temperature, and the second temperature is lower than the first temperature.

2. The container of claim 1, wherein the push-up portion is central and the first and second parting lines are aligned with the center of the base.

3. The container of claim 1, wherein the third parting line has a closed contour surrounding the push-up portion, and wherein the first and second parting lines are starting substantially from the third parting line.

4. The container of claim 1, wherein non-symmetrical stretching of the base occurs, and the third parting line is off-centered.

5. The container of claim 1, wherein the distance between the first parting line and the center of the base is not more than 15 mm, and wherein the distance between the second parting line and the center of the base is not more than 15 mm.

6. The container of claim 1, wherein the distance between the first and second parting lines is not more than 35 mm.

7. The container of claim 1, wherein the distance between the first and second parting lines is not more than 40% of the transverse dimension of the base measured between the two outermost points of the parting lines.

8. The container of claim 1, wherein the distance between the first and second parting lines is not less than 10 mm.

9. The container of claim 1, wherein the movable wall is surrounded by a heel portion configured to form a contact ring for supporting the container.

10. The container of claim 1, wherein the movable wall forms substantially a frustroconical wall in the original state, and an inverted frustroconical wall in the deformed state.

11. A method for double-blow molding a heat-resistant plastic container, comprising:
  (a) providing a plastic preform in a mold cavity of a primary blow mold that includes a mold cavity defined by a pair of mold halves and a base mold, each mold half having an upper cylindrical molding portion and a bottom molding portion including a non-cylindrical sidewall extending from the upper cylindrical molding portion, the mold cavity including a bottom wall formed by a bottom part of each mold half, and the base mold including a protruding centering portion that protrudes inside the mold cavity through the bottom wall,
  (b) biaxially stretch blow molding the preform inside the mold cavity to form a primary biaxially stretched container having a base including a pushup portion molded by the protruding centering portion of the primary blow mold and first and second parting lines formed in a contact plane of the two mold halves, separated from one another by a gap, extending on opposite sides of the pushup portion,
  (c) heating the primary biaxially stretched container inside or outside the primary blow mold to make the primary biaxially stretched container shrink and to obtain a secondary shrunk container, wherein the base mold of the primary mold is heated to a temperature lower than the heating temperature of the pair of mold halves,
  (d) providing the secondary shrunk container in a secondary blow mold,
  (e) blow molding the secondary shrunk container inside the secondary blow mold to form a final biaxially stretched and heat-resistant container including a base that is movable to accommodate vacuum forces generated within the container thereby decreasing a volume of the container, the base including a movable wall including the pushup portion and the first and second parting lines, and the stretching of the base inside the secondary blow mold to obtain one or more of the following:
  (i) a distance between each parting line and a center of the base of not more than 20 mm;
  (ii) a distance between the two parting lines of not more than 40 mm; or
  and/or
  (iii) a distance between the two parting lines of less than 50% of the transverse dimension of the base measured between the two outermost points of the parting lines.

12. The method of claim 11, wherein the push-up portion is central and the first and second parting lines are aligned with the center of the base.

13. The method of claim 11, wherein the primary biaxially stretched container comprises a third parting line of closed contour formed at the interface between the base mold and the two mold halves, and wherein the first and second parting lines are starting substantially from the third parting line.

14. The method of claim 11, wherein the non-cylindrical sidewall is convex.

15. The method of claim 11, wherein the maximum transverse dimension of the protruding centering portion and the stretching of the base inside the secondary blow mold to obtain a distance between each first and second parting line and the center of the base of not more than 15 mm.

16. The method of claim 11, wherein the maximum transverse dimension of the protruding centering portion and the stretching of the base inside the secondary blow mold to obtain a distance between the first and second parting lines of not more than 35 mm.

17. The method of claim 11, wherein the maximum transverse dimension of the protruding centering portion and the stretching of the base inside the secondary blow mold to obtain a distance between the first and second parting lines of not more than 40% of the transverse dimension of the base measured between the two outermost points of the parting lines.

18. The method of claim 11, wherein the maximum transverse dimension of the protruding centering portion is not more than 30 mm.

19. The method of claim 11, wherein the maximum transverse dimension of the protruding centering portion is not more than 20 mm.

20. The method of claim 11, wherein the preform is made of a plastic material comprising a PET homo or copolymer.

21. The method of claim 11, wherein the mold cavity of the primary blow mold and the mold cavity of the secondary blow mold are heated to temperatures above the Tg of the plastic material of the preform.

22. The method of claim 11, wherein the heating temperature of the base mold of the primary mold is about 120° C. to about 130° C.

23. The method of claim 22, wherein the heating temperature of the pair of mold halves is at least about 60° C. higher than the heating temperature of the base mold, and the portion of the base proximate the base mold has a lower crystallinity than the remaining portions of the container base molded by the pair of mold halves forming the bottom wall.

* * * * *